United States Patent [19]
Kimura

[11] Patent Number: 5,301,266
[45] Date of Patent: Apr. 5, 1994

[54] APPARATUS TO IMPROVE IMAGE ENLARGEMENT OR REDUCTION BY INTERPOLATION

[75] Inventor: Tokunori Kimura, Utsunomiya, Japan

[73] Assignee: Kabushiki Kaisha Toshiba, Kawasaki, Japan

[21] Appl. No.: 616,228

[22] Filed: Nov. 20, 1990

[30] Foreign Application Priority Data

Nov. 20, 1989 [JP] Japan ................................ 1-301052

[51] Int. Cl.$^5$ .............................................. G06F 15/62
[52] U.S. Cl. ................................... 395/139; 395/133;
    364/724.1; 364/724.05; 364/724.18
[58] Field of Search ................................ 395/133, 139;
    364/724.05, 724.1, 724.18; 382/54

[56] References Cited
U.S. PATENT DOCUMENTS 4,740,896  4/1988  Horiba et al. ................... 382/54 X
4,827,433  5/1989  Kamon .................................. 395/139

Primary Examiner—Gary V. Harkcom
Assistant Examiner—Almis Jankus
Attorney, Agent, or Firm—Limbach & Limbach

[57] ABSTRACT

An image interpolation apparatus receives an image signal in the frequency domain. The image signal is supplied to a filter circuit. The output of the filter circuit is transformed by a two-dimensional fourier transformation circuit into a filtered image signal in the spatial domain. The filtered image signal is linearly interpolated by an interpolation circuit to enlarge or reduce the image representing the image signal. The filter circuit, the fourier transformation circuit and the interpolation circuit are under the control of a processor. The processor sets the filter circuit a filter function representing the inverse of the modulated transfer function of the interpolation circuit to compensate for the degradation caused by the modulated transfer function of the interpolation circuit.

14 Claims, 7 Drawing Sheets

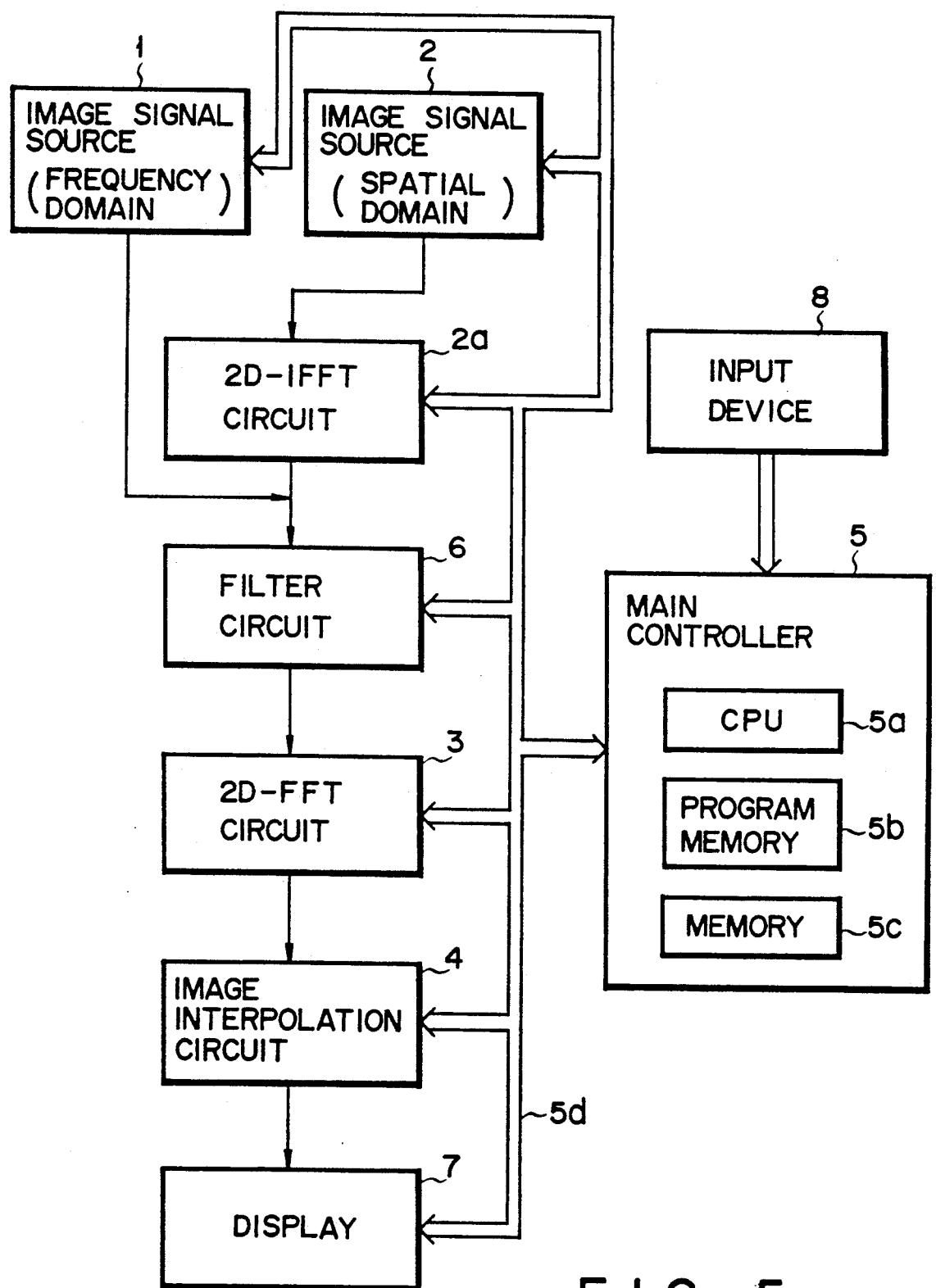
F I G. 5

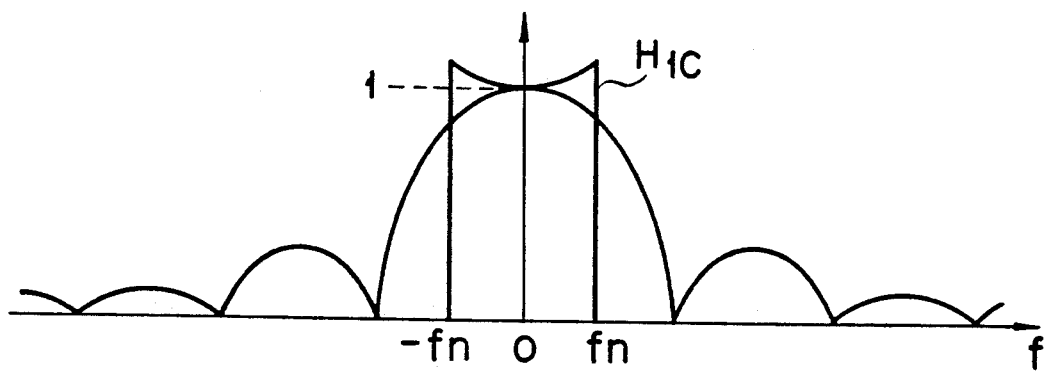
F I G. 6A
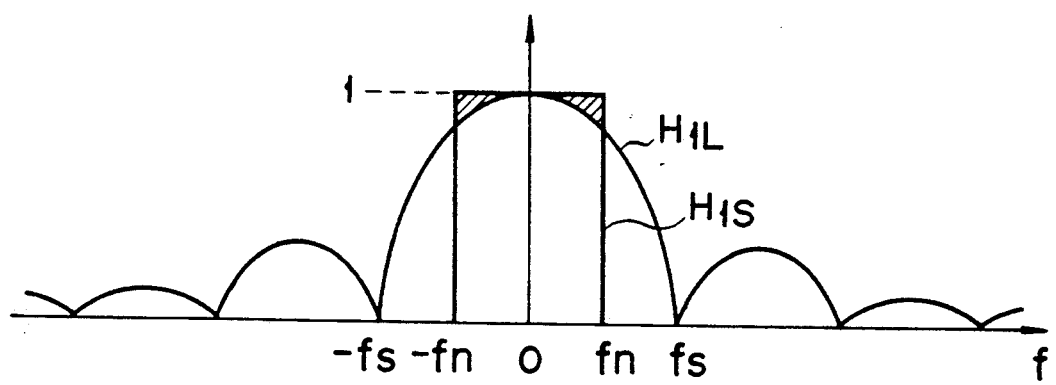
F I G. 6B
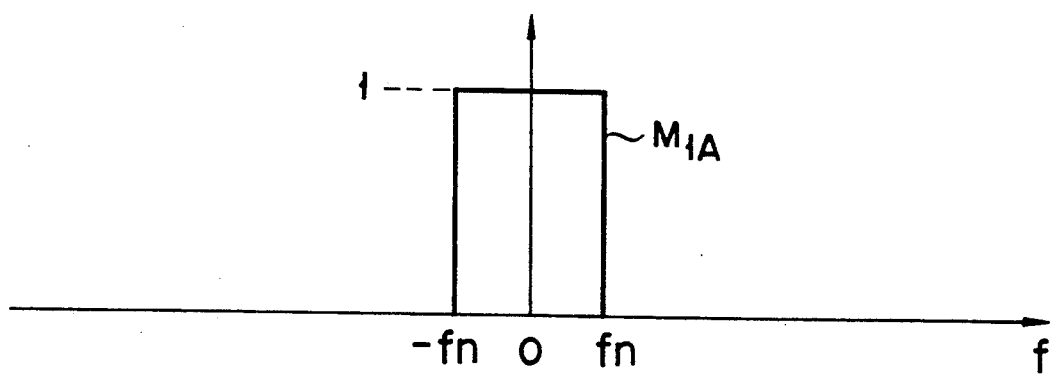
F I G. 6C

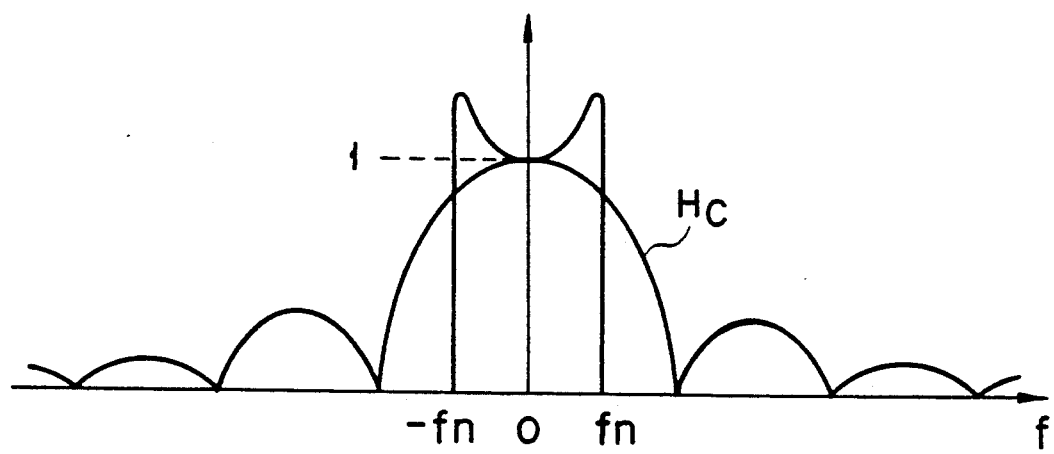
F I G. 9A
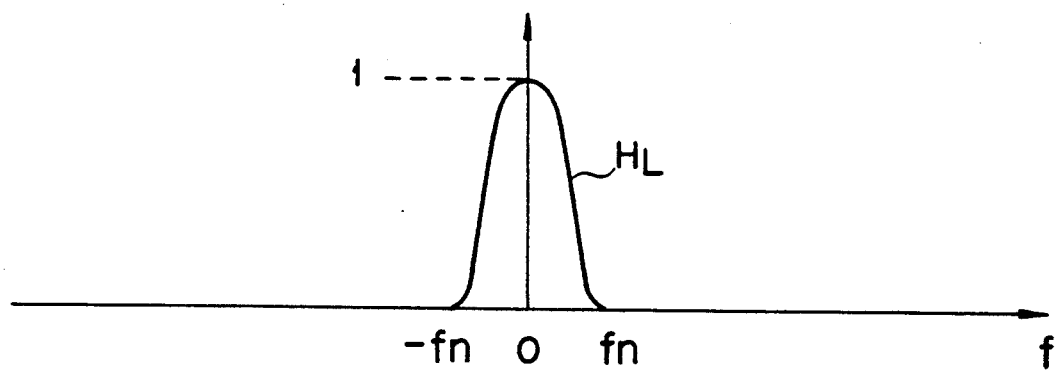
F I G. 9B
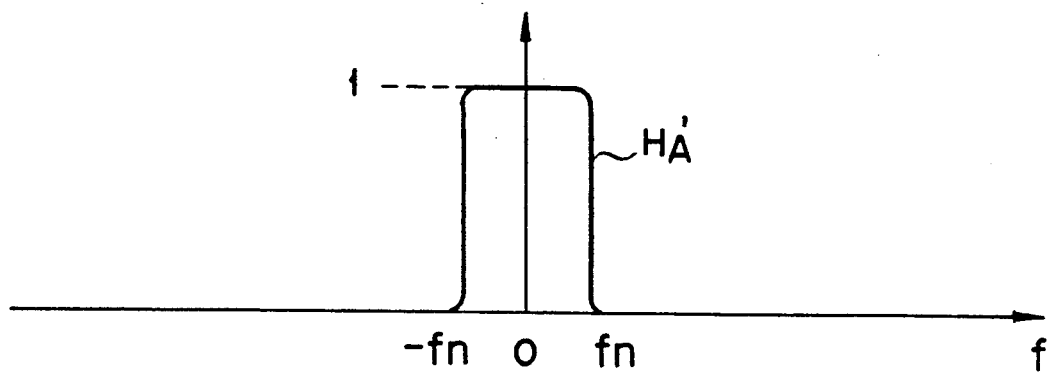
F I G. 9C

APPARATUS TO IMPROVE IMAGE ENLARGEMENT OR REDUCTION BY INTERPOLATION

BACKGROUND OF THE INVENTION

1. Field of the Invention

The present invention relates to an image interpolation apparatus which can minimize degradation of a spatial resolution caused by interpolation performed when an image is enlarged/reduced by affine transformation or the like.

2. Description of the Related Art

As an example of affine transformation, an image enlarging/reducing is performed. Enlargement of an image by means of affine transformation is performed as in the following two cases: a case wherein, as shown in FIG. 1, the display size of an image is not changed but the number of pixels (each represented by a square) is increased with respect to an original image (in this case, the display size of each pixel is reduced); and another case wherein, as shown in FIG. 2, both the display size of an image and the number of pixels are increased (in this case, the display size of each pixel is not changed). New pixel data generated by enlargement processing (affine transformation) is obtained from the pixel data of an original image data by interpolation. When reduction of an image is to be performed, interpolation is also performed.

Such interpolation includes 0th-order (nearest neighbor) interpolation, 1st-order interpolation (linear interpolation), higher-order (3rd, 5th, 7th, ...) interpolation, Lagrange's interpolation, spline interpolation, and sinc interpolation. Linear interpolation advantageously allows simple processing. An advantage of higher-order interpolation, e.g., sinc interpolation is that high-precision processing can be performed.

Linear interpolation in which a number of pixels of the image is increased four times will be described below with reference to FIG. 3. Referring to FIG. 3, four pixel data of an original image shown on the left side are respectively denoted by reference symbols a to d. Assume that the original image is subjected to affine transformation to increase the number of pixels four times without changing the display size in the same manner as described with reference to FIG. 1, and an enlarged image shown on the left side in FIG. 3 is obtained. In the enlarged image, pixel data between the pixels a and c is interpolated as $(a+c)/2$ on the basis of the two pixel data. Similarly, pixel data between the pixels c and d is interpolated as $(c+d)/2$; pixel data between the pixels b and d, as $(b+d)/2$; pixel data between a and b, as $(a+b)/2$; and pixel data in the center of the pixels a, b, c, and d, as $(a+b+c+d)/4$. Pixels indicated by hatched portions in FIG. 3 are respectively interpolated by using adjacent pixels in the vertical and horizontal directions. In sinc interpolation, new pixels of an enlarged image are interpolated by means of a convolution integration of sinc function and surrounding pixels of the original image.

Linear interpolation and sinc interpolation can be considered as filter processing. Degradation of a modulation transfer function characteristic (to be referred to as an MTF characteristic hereinafter) by an interpolation filter will be described below. FIG. 4A shows an MTF characteristic $M_O$ in an original image. FIG. 4B shows the MTF characteristic of an affine transformation circuit (interpolation filter), in which a characteristic $H_L$ is obtained by linear interpolation and a characteristic $H_S$ is obtained by sinc interpolation. As indicated in FIG. 4B, the MTF characteristic $H_L$ of the linear filter exhibits a low-pass filter characteristic in which a high-frequency gain is degraded, whereas the MTF characteristic $H_S$ of the sinc interpolation filter exhibits a frequency characteristic in which a gain is kept constant and not changed from a zero frequency to a Nyquist frequency fn. For this reason, an MTF characteristic $M_S'$ of an image upon affine transformation using the sinc interpolation filter is substantially the same as the MTF characteristic $M_O$ of the original image, as shown in FIG. 4C. However, an MTF characteristic $M_L'$ of an image upon affine transformation using the linear interpolation filter exhibits degradation in a high-frequency range due to the low-pass filter effect.

The degradation of the MTF characteristic in the high-frequency range causes degradation of the spatial resolution of an image. For this reason, if the display size of an image is enlarged by affine transformation using the linear interpolation filter so as to perform diagnosis of details, the image is defocused and the diagnosis of details is difficult to perform. In affine transformation using the sinc interpolation filter, although degradation of a spatial resolution can be prevented, the processing time for interpolation is 10 or more times longer than that in affine transformation using the linear interpolation filter. As described above, in the conventional interpolation techniques for enlargement of images, simple linear interpolation results in poor spatial resolution, and if sinc interpolation is performed to improve the spatial resolution, the processing time is greatly prolonged. This equally applies to reduction of images and to other interpolation processing for enlargement/reduction of images other than affine transformation.

SUMMARY OF THE INVENTION

It is an object of the present invention to provide an image interpolation apparatus which can perform interpolation processing of a high spatial resolution within a short period of time without degrading an MTF characteristic and decreasing the spatial resolution of an image.

According to the present invention, there is provided an image interpolation apparatus comprising filter means for receiving an image signal in a frequency domain and multiplying the input image signal with a filter function, Fourier transformation means for performing Fourier transformation of an output from the filter means to obtain an image signal in a spatial domain, interpolation means for enlarging/reducing an image by a linear interpolation processing of an output from the Fourier transformation means, and filter function determining means for determining the filter function such that the filter function has an inverse characteristic of a modulation transfer function (MTF) characteristic of the interpolation means.

According to such an interpolation apparatus, since an image is enlarged/reduced by a linear interpolation processing, a simple arrangement can be realized and the processing time can shortened. In addition, since degradation of an MTF characteristic due to the linear interpolation processing is compensated for in advance by using the filter means, degradation of a spatial resolution can be prevented. Further, since filter processing for compensation is performed in a frequency domain, the processing can be performed by simple multiplication. Therefore, a simple arrangement can be realized and the processing time can be shortened.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 is a block diagram showing an image interpolation apparatus according to a first embodiment of the present invention;

FIGS. 6A to 6C are graphs, each showing an MTF characteristic, for explaining an operation of the first embodiment;

FIGS. 9A to 9C are graphs, each showing an MTF characteristic, for explaining an operation of a modification of the second embodiment.

DETAILED DESCRIPTION OF THE PREFERRED EMBODIMENTS

Figure 1:
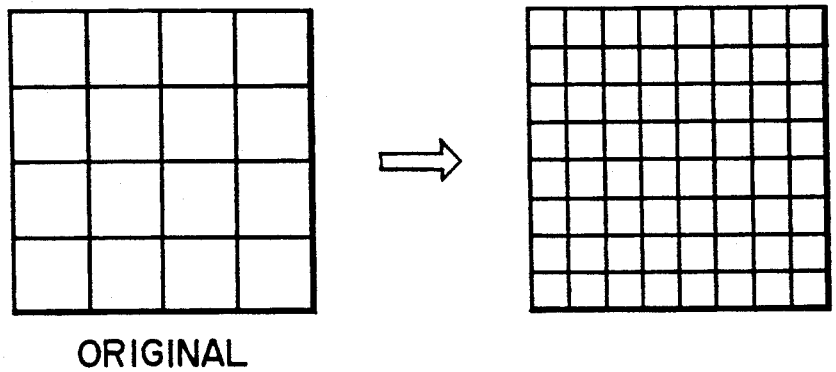
FIG. 1 is a view showing a case wherein enlargement of an image is performed by increasing only the number of pixels without changing a display size.

Embodiments of an image interpolation apparatuses according to the present invention will be described below with reference to the accompanying drawings. FIG. 5 is a block diagram showing an arrangement of a first embodiment of the present invention. Two types of image signal sources 1 and 2 are provided in which the source 1 is for an image signal in a frequency domain and the source 2 is for an image signal in a spatial domain (or a time domain). For example, an MR signal in an MRI (magnetic resonance imaging) system is an image signal in a frequency domain. That is, the image signal source 1 is formed of, e.g., an RF coil, a receiver, and the like used in the MRI system.

The output signal from the image signal source 2 is input to a two-dimensional inverse fast Fourier transformation circuit (2D-IFFT circuit) 2a and is converted to an image signal in a frequency domain. The outputs from the image signal source 1 and the 2D-IFFT circuit 2a are supplied to a filter circuit 6. The filter circuit 6 (to be described later) serves to compensate for degradation of an MTF characteristic by affine transformation, i.e., interpolation. The filter circuit 6 for a signal in a frequency domain can be realized by a simple multiplier.

The output signal from the filter circuit 6 is supplied to a two-dimensional Fourier transformation circuit 3. The Fourier transformation circuit 3 performs Fourier transformation of a signal in a frequency domain to obtain an image signal in a spatial domain. Note that a fast Fourier transformation (FFT) circuit is used as the Fourier transformation circuit 3.

An output from the 2D-FFT circuit 3 is supplied to an image interpolation circuit 4, and enlargement or reduction processing using a linear interpolation filter is performed. An output from the image interpolation circuit 4 is displayed on a display 7 such as a CRT. The display 7 displays an image obtained by arbitrarily enlarging or reducing the size of an image represented by the MR signal output from the image signal source 1.

The apparatus also includes a main controller 5 for controlling an overall operation. The main controller 5 comprises a CPU 5a, a program memory 5b, and a memory 5c for storing data. The respective circuit components 1, 2, 2a, 6, 3, 4, and 7 are connected to a bus line 5d of the CPU 5a. An input device 8 such as a keyboard is connected to the controller 5.

As described above, an MTF characteristic $H_{1L}(f)$ of the linear interpolation filter of the image interpolation circuit 4 is a low-pass filter characteristic. For this reason, the MTF characteristic $H_{1L}(f)$ is degraded in a high-frequency range with respect to a characteristic $H_{1S}(f)$ of an ideal interpolation filter (sinc interpolation filter), as indicated by hatched portions in FIG. 6B. The MTF characteristic $H_{1L}(f)$ of the linear interpolation filter is given by the following equation, provided that the filter is a one-dimensional filter for the sake of simplification:

$$H_{1L}(f) = \frac{[\sin\{(2\pi/N) \times (f/fs)\}]^2}{\{(2\pi/N) \times (f/fs)\}^2} \quad (1)$$

where $|f| < fn$, f is a spatial frequency, fn is a Nyquist frequency, fs is the sampling frequency of an image signal, and N is the magnification factor of the image in the image interpolation circuit 4.

The CPU 5 determines the filter function of the filter circuit 6 to compensate for degradation of the MTF characteristic by the image interpolation circuit 4 (i.e., its linear interpolation filter). In this embodiment, as shown in FIG. 6A, a filter function $H_{1C}(f)$ of the filter circuit 6 is determined to improve an MTF characteristic $H_{1C}$ of the filter circuit 6, in advance, by a degree corresponding to degradation of the MTF characteristic $H_{1L}$ of the linear interpolation filter in the image interpolation circuit 4, i.e., to set the characteristic $H_{1C}$ to be the inverse characteristic of the characteristic $H_{1L}$ (a relation that a multiplication of original function and the inverse function yields 1). The filter function $H_{1C}$ of the filter circuit 6 can be represented as follows, provided that the filter is a one-dimensional filter for the sake of simplification:

$$H_{1C}(f) = 1/H_{1L}(f) \qquad (2)$$

$$= \frac{\{(2\pi/N) \times (f/f_s)\}^2}{[\sin\{(2\pi/N) \times (f/f_s)\}]^2}$$

It is apparent that a function representing the MTF characteristic of the two-dimensional linear interpolation filter and the filter function of the two-dimensional filter circuit 6 can be represented by equations similar to equations (1) and (2).

Since the filter circuit 6 is only required to process an image signal in a frequency domain, it can simply perform filtering by multiplication.

It is apparent from equations (1) and (2) that the overall MTF characteristic of the interpolation apparatus formed of the filter circuit 6, the 2D-FFT circuit 3, and the image interpolation circuit 4 is substantially the same as the characteristic obtained by sinc interpolation. That is, $M_{1A} = H_{1C}(f) \times H_{1L}(f) = 1$ ($|f| \leq f_n$).

Figure 2:
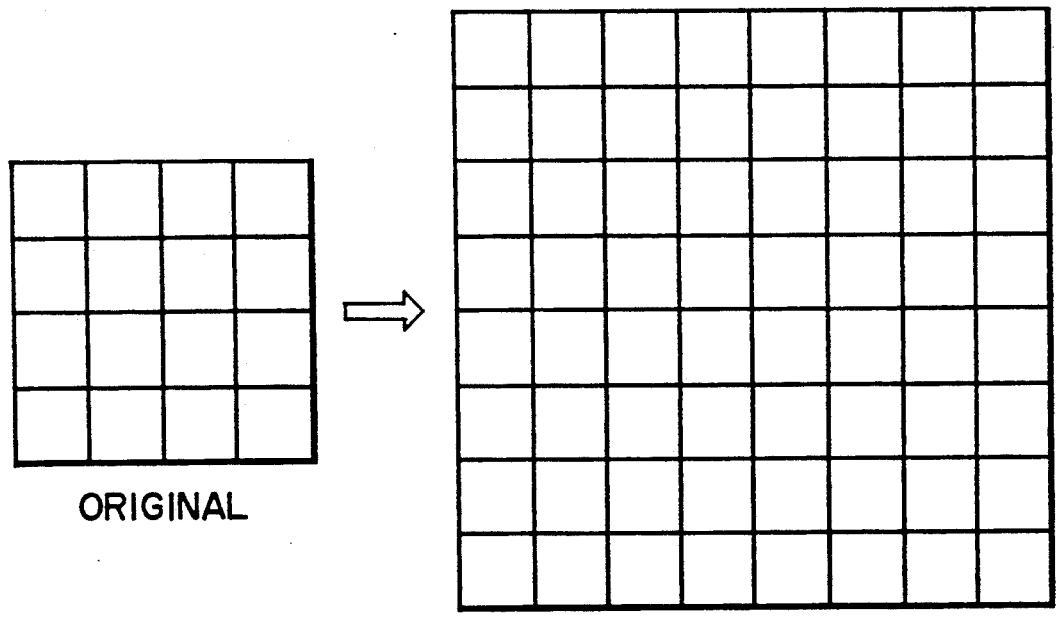
FIG. 2 is a view showing a case wherein enlargement of an image is performed by increasing both a display size and the number of pixels.
Figure 3:
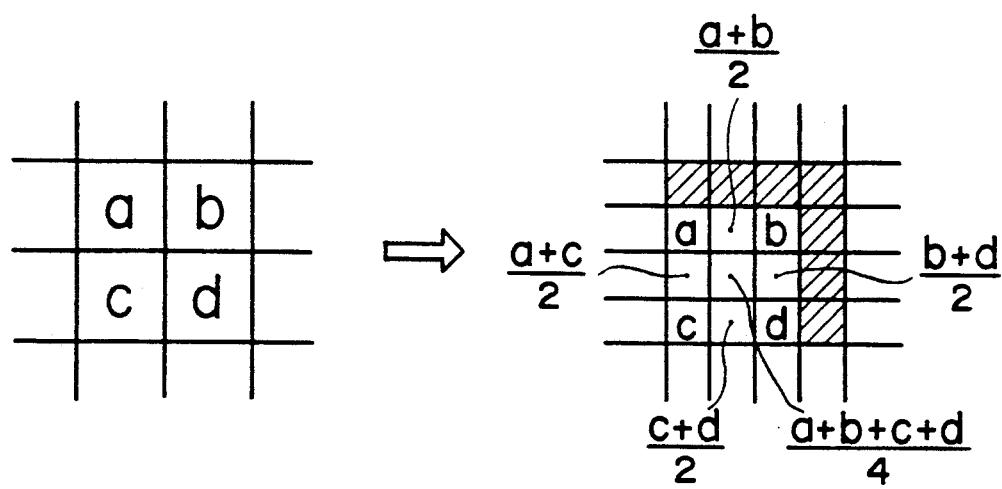
FIG. 3 is a view showing a case of linear interpolation.
Figure 4A:
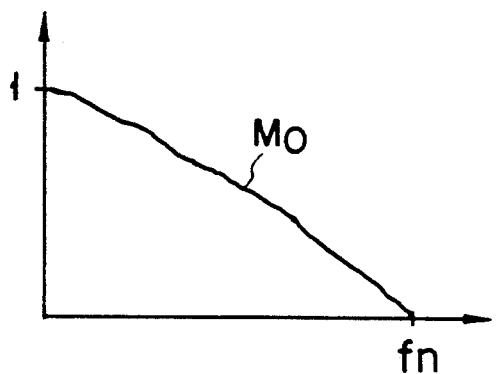
FIGS. 4A to 4C are graphs each showing the degree of degradation of an MTF characteristic by interpolation performed when an image is enlarged.
Figure 4B:
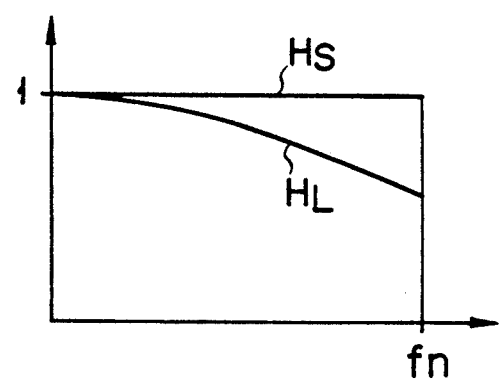
Figure 4C:
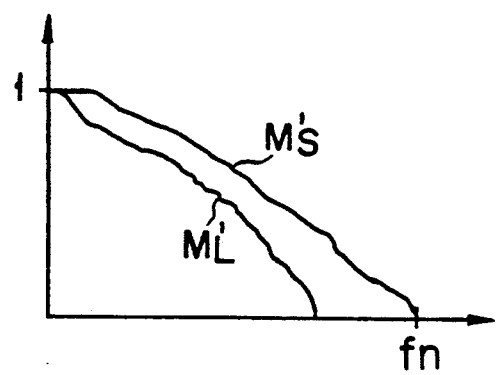

An operation of the first embodiment will be described below. Data from the image signal source 1 or data from the image signal source 2 is displayed first without changing the magnification, i.e., without enlargement/reduction. An operator watches the image on the display 7, determines a magnification factor N of the image, and inputs the magnification factor N to the CPU 5a by the input device 8. The magnification factor is usually defined by a ratio of the number of pixels and in this case is defined by a ratio of the number of pixels per one side of the square image. When, for example, the image is to be enlarged as shown in FIG. 2, the magnification factor N (=2) is input to the CPU 5a so as to increase the whole number of pixels four times and to increase the vertical and horizontal display sizes two times (i.e., an area ratio is 4).

The CPU 5a controls the respective circuits 6, 3, and 4 in accordance with the program stored in the program memory 5b to start affine transformation (enlargement and interpolation). The CPU 5a reads out equation (2) representing a filter function and restored in the memory 5c, and determines a filter function upon calculation. That is, the filter function is determined by substituting N=2 into equation (2). The determined function is set in the filter circuit 6.

When the image data in the spatial domain is generated from the image signal source 2, the image signal in the spatial domain is converted into the image signal in frequency domain by the 2D-IFFT circuit 2a. The filter circuit 6 performs filtering of an original image signal (in a frequency domain) in accordance with the determined filter function. That is, the original image signal is multiplied by the filter function. The filtered signal is subjected to two-dimensional fast Fourier transformation in the 2D-FFT circuit 3 so as to be transformed into an image signal in a spatial domain. Subsequently, the image signal in a spatial domain is subjected to affine transformation in the image interpolation circuit 4.

As described above, according to the first embodiment, since affine transformation uses the linear interpolation, a simple arrangement can be realized, and the processing time can be shortened. Since degradation of the MTF characteristic by the linear interpolation is compensated for by the filter circuit 6 in advance, degradation of a spatial resolution can be prevented in spite of simple linear interpolation. In addition, since filter processing to compensate for degradation of the MTF characteristic is performed in a frequency domain, the processing can be simply performed by multiplication.

Figure 7:
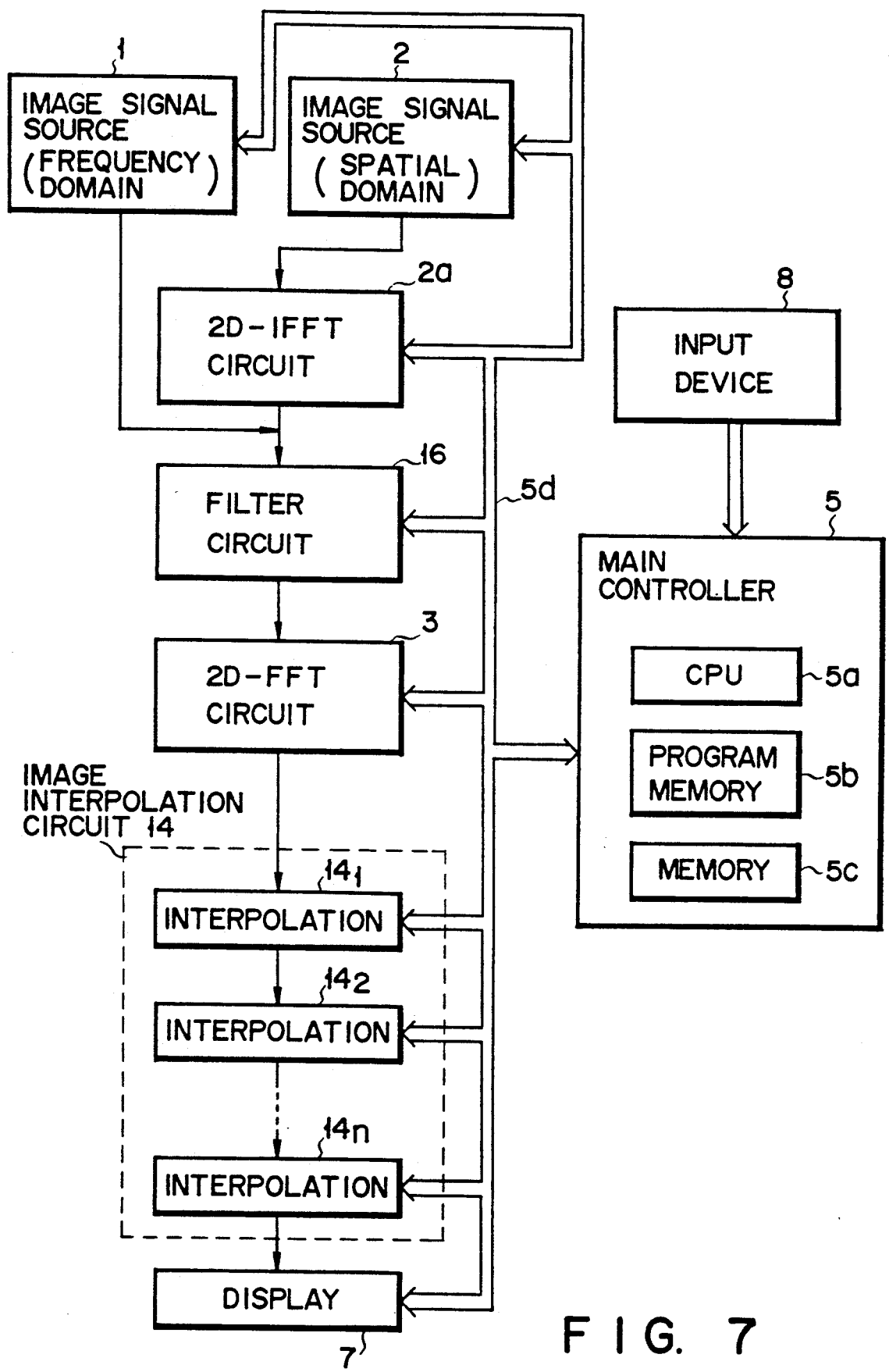
FIG. 7 is a block diagram showing an image interpolation apparatus according to a second embodiment of the present invention.
Figure 8A:
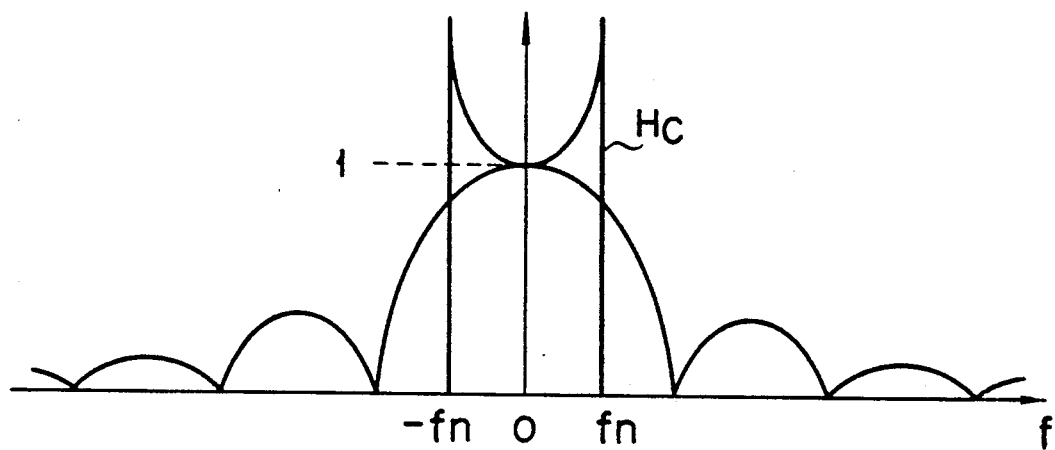
FIGS. 8A to 8C are graphs, each showing an MTF characteristic, for explaining an operation of the second embodiment.
Figure 8B:
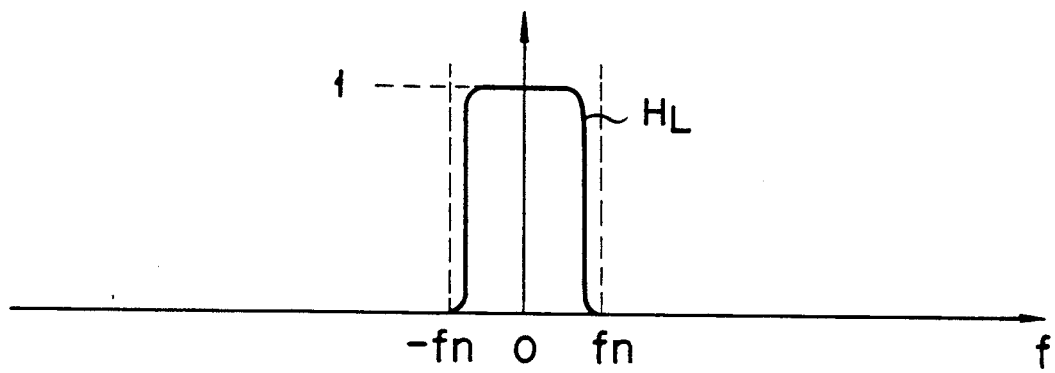

A second embodiment of the present invention will be described below. FIG. 7 is a block diagram showing the second embodiment. The same reference numerals as in the first embodiment denote the same parts in the second embodiment, and a detailed description thereof will be omitted. The second embodiment is different from the first embodiment only in a filter circuit 16 and an image interpolation circuit 14. The image interpolation circuit 14 is formed of a plurality of interpolation circuits $14_1$ to $14_n$. The interpolation circuit $14_1$ performs the same processing (linear interpolation) as that performed by the image interpolation circuit 4 in the first embodiment. Therefore, the interpolation circuit $14_1$ has the same MTF characteristic as the characteristic $H_{1L}$ shown in FIG. 6B. The other interpolation circuits $14_2$ to $14_n$ respectively perform linear interpolations. Since the high frequency component is degraded during the linear interpolation, a total MTF characteristic $H_L$ of the interpolation circuits $14_1$ to $14_n$ exhibits moderate leading and trailing edges, as shown in FIG. 8B.

The filter circuit 16 is defined to have an inverse characteristic $H_C$ of MTF characteristic $H_L$ of the image interpolation circuit 14. The filter function $H_C$ of the filter circuit 16 can be represented by the following equation, provided that the filter is a one-dimensional filter for the sake of simplification:

$$H_C(f) = 1/H_L(f) \qquad (3)$$

where $H_L(f)$ is a function representing the MTF characteristic of the image interpolation circuit 14. If functions representing MTF characteristics of the interpolation circuits $14_1$ to $14_n$ are respectively represented by $H_{1L}$ to $H_{NL}$, the function $H_L$ is given by the following equation:

$$H_L(f) = H_{1L}(f) \times H_{2L}(f) \times H_{3L}(f) \times \ldots \times H_{NL}(f) \qquad (4)$$

Figure 8C:
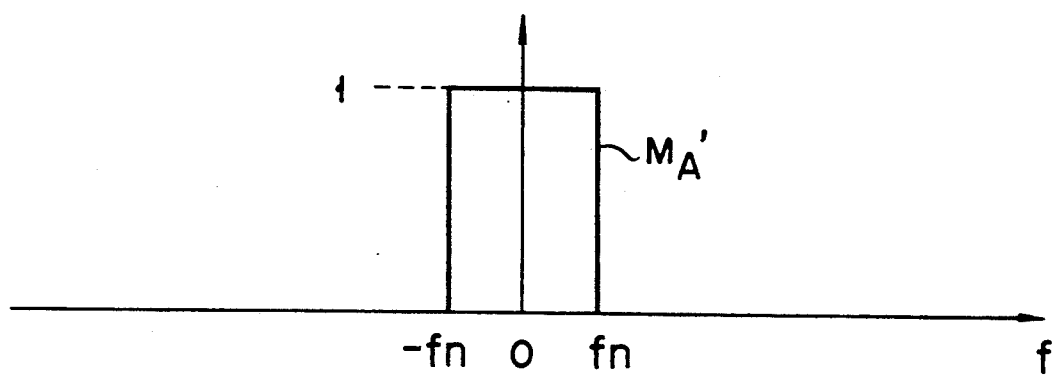

Since the filter circuit 16 is only required to process the image signal in a frequency domain, it can simply perform filtering by multiplication. Therefore, a total MTF characteristic $M_A'$ of the affine transformation circuit formed of the filter circuit 16, the 2-D FFT circuit 3, and the image interpolation circuit 14 is substantially the same as the MTF characteristic obtained by sinc interpolation, as shown in FIG. 8C. That is, $M_A' = H_C(f) \times H_L(f) = 1 (|f| \leq f_n)$.

In the second embodiment, the same effects as those in the first embodiment can be obtained. That is, even if the image interpolation circuits is formed of many interpolation circuits, the filter function compensating for the degradation of the MTF characteristic can be obtained if the MTF characteristics of the respective interpolation circuits are known.

The present invention is not limited to the above-described embodiments, and various changes and modifications can be made. In the above embodiments, the filter function is so determined as to have an inverse characteristic of the MTF characteristic of the image interpolation circuit. However, in order to reduce a truncation artifact (Gibb's Ringing) caused by an abrupt cutoff operation at the Nyquist frequency fn, and to prevent aliasing of data having a spatial frequency other than the Nyquist frequency fn, a total MTF characteristic of the image interpolation circuit should exhibit moderate leading and trailing edges not a complete rectangular shape as shown in FIG. 9C. That is, a modification of the second embodiment using this technique is shown in FIGS. 9A to 9C. FIG. 9A shows the MTF characteristic of the filter function and FIG. 9B shows the MTF characteristic of the image interpolation circuit. In the above embodiments, since an MRI apparatus is exemplified, the filter circuit for compensating for degradation of the MTF characteristic is inserted to filter a signal in a frequency domain. However, the filter circuit may be inserted to filter a signal in a time domain. In this case, filtering is not performed by simple multiplication but is performed by convolution integration processing. Therefore, the present invention is not limited to an MRI apparatus but may be applied to other general image display apparatuses such as an X-ray CT apparatus. Similarly, in this case, filter processing need not be performed in a time domain. More specifically, an X-ray projection signal in a time domain is converted to a signal in a frequency domain by two-dimensional inverse Fourier transformation before it is supplied to the data acquisition circuit of the X-ray CT apparatus. Thereafter, the signal is transformed into a signal in the time domain again by two-dimensional Fourier transformation, and affine transformation is performed. In addition, instead of obtaining filter function by inputting the magnification factor N and calculating equation (2), filter functions corresponding to magnification factors frequently used may be calculated and stored in a ROM or the like in advance. Although the above description is associated with interpolation for enlargement of an image, interpolation for reduction of an image can be performed in the same manner as described above, and hence the present invention can be applied to image reduction. Furthermore, processing for enlargement/reduction is not limited to affine transformation, and other similar transformation schemes may be employed. Moreover, since the present invention is characterized by including the filter for compensating for degradation of the MTF characteristic in advance, affine transformation (linear interpolation) is not limited to 1st-order interpolation, and 2nd-order interpolation, 3rd-order interpolation, ... may be employed as long as a processing time falls within an allowable range.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image interpolation apparatus comprising:
    filter circuit means having a filter function, for receiving an image signal in a frequency domain and for generating a filtered image signal in response thereto, said image signal representing a first image;
    Fourier transformation circuit means for receiving said filtered image signal and for performing a Fourier transformation thereof to output a spatial image signal;
    interpolation circuit means having a modulation transfer function for receiving said spatial image signal and for performing a linear interpolation thereof to generate a transformed image signal, said transformed image signal representing a second image, said second image being an enlargement or a reduction of said first image; and
    means for controlling the filter function of said filter means such that said filter circuit means compensates for said modulation transfer function.

2. An apparatus according to claim 1, wherein said controlling means comprises means for setting said filter function to an inverse modulation transfer function of said interpolation circuit means.

3. An apparatus according to claim 2, wherein said interpolation circuit means has a one-dimensional modulation transfer function, $H_{1L}(f)$ represented by:

$$H_{1L}(f) = \frac{[\sin\{(2\pi/N) \times (fs/f)\}]^2}{\{(2\pi/N) \times (fs/f)\}^2}$$

where $|f| < fn$, f is a spatial frequency of the image signal, fn is a Nyquist frequency, fs is a sampling frequency of the image signal, and N is a magnification factor of the image, and said controlling means comprises means for setting the filter function $H_{1C}(f)$ represented by:

$$H_{1C}(f) = 1/H_{1L}(f)$$
$$= \frac{\{(2\pi/N) \times (fs/f)\}^2}{[\sin\{(2\pi/N) \times (fs/f)\}]^2}$$

4. An apparatus according to claim 3, wherein said means for controlling the filter function comprises means for calculating the filter function by using the magnification factor N as a parameter.

5. An apparatus according to claim 3, wherein said means for controlling the filter function comprises means for calculating the filter function by using the magnification factor N as a parameter and storing the result.

6. An apparatus according to claim 1, wherein said interpolation circuit means is an affine transformation circuit means.

7. An apparatus according to claim 1, wherein said Fourier transformation circuit means is a two-dimensional fast Fourier transformation circuit means.

8. An apparatus according to claim 1, wherein said filter circuit means is connected to a receiver of a magnetic resonance imaging apparatus to receive a magnetic resonance signal received by the receiver.

9. An apparatus according to claim 1, wherein said interpolation circuit means comprises means for changing a pixel size and changing the number of pixels without changing an overall size of said first image.

10. An apparatus according to claim 1, wherein said interpolation circuit means comprises means for changing an overall size of said first image without changing a pixel size.

11. An image interpolation apparatus comprising:
    interpolation circuit means, having an input terminal for receiving an image signal, said interpolation circuit means having a predetermined, modulation transfer function for enlarging or reducing said image signal;
    multiplying circuit means, having an inverse of the modulation transfer function of said interpolation circuit means, connected to said input terminal, for receiving said image signal in a frequency domain, and Fourier circuit transformation means for transforming an output from said multiplying circuit means into a signal in a time domain and supplying the signal to said interpolation circuit means.

12. The apparatus of claim 11, wherein said multiplying circuit means has a filter function corresponding to a magnification factor of said interpolation circuit means.

13. An image interpolation apparatus comprising:
   interpolation circuit means, having an input terminal for receiving an image signal, said interpolation circuit means having a predetermined, modulation transfer function for enlarging or reducing said image signal; and
   convolution means, having an inverse of the modulation transfer function of said interpolation circuit means, for receiving an image signal in a time domain.

14. The apparatus of claim 13, wherein said convolution means has a filter function corresponding to a magnification factor of said interpolation circuit means.

* * * * *